(12) United States Patent
Taoka et al.

(10) Patent No.: US 8,873,663 B2
(45) Date of Patent: Oct. 28, 2014

(54) MOBILE STATION APPARATUS, BASE STATION APPARATUS, MIMO SYSTEM AND DATA TRANSMISSION METHOD

(75) Inventors: Hidekazu Taoka, Tokyo (JP); Katsutoshi Kusume, Tokyo (JP); Karim Ibrahim Khashaba, Tokyo (JP); Guido Dietl, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 199 days.

(21) Appl. No.: 13/511,067

(22) PCT Filed: Nov. 26, 2010
(Under 37 CFR 1.47)

(86) PCT No.: PCT/JP2010/071176
§ 371 (c)(1),
(2), (4) Date: Nov. 28, 2012

(87) PCT Pub. No.: WO2011/065508
PCT Pub. Date: Jun. 3, 2011

(65) Prior Publication Data
US 2013/0287132 A1    Oct. 31, 2013

(30) Foreign Application Priority Data
Nov. 30, 2009    (JP) .................. 2009-272443

(51) Int. Cl.
| | |
|---|---|
| *H04B 7/02* | (2006.01) |
| *H04B 7/06* | (2006.01) |
| *H04L 25/03* | (2006.01) |
| *H04L 1/00* | (2006.01) |
| *H04B 7/04* | (2006.01) |
| *H04W 52/34* | (2009.01) |
| *H04L 25/02* | (2006.01) |

(52) U.S. Cl.
CPC ............ *H04B 7/0456* (2013.01); *H04B 7/0639* (2013.01); *H04L 25/03949* (2013.01); *H04B 7/0632* (2013.01); *H04L 1/0026* (2013.01); *H04L 2025/03808* (2013.01); *H04B 7/0452* (2013.01); *H04B 7/0486* (2013.01); *H04W 52/346* (2013.01); *H04B 7/0689* (2013.01); *H04L 1/0002* (2013.01); *H04L 25/0202* (2013.01)
USPC ........... 375/267; 375/260; 375/225; 375/299; 375/347; 375/349; 455/500; 455/101; 455/102; 455/103; 455/132

(58) Field of Classification Search
USPC ................. 375/267, 260, 225, 299, 347, 349; 455/500, 101, 102, 103, 132
See application file for complete search history.

(56) References Cited

U.S. PATENT DOCUMENTS

| | | | | |
|---|---|---|---|---|
| 2008/0304464 | A1* | 12/2008 | Borkar et al. ................. | 370/342 |
| 2012/0051257 | A1* | 3/2012 | Kim et al. ..................... | 370/252 |

OTHER PUBLICATIONS

International Search Report w/translation from PCT/JP2010/071176 dated Dec. 28, 2010 (4 pages).

(Continued)

*Primary Examiner* — Rahel Guarino
(74) *Attorney, Agent, or Firm* — Osha Liang LLP

(57) ABSTRACT

A data transmission method includes, in the mobile station apparatus, selecting a PMI and an RI corresponding to an Hermitian transpose of a channel matrix indicative of channel characteristics and calculating a CQI from the PMI. The method further includes transmitting the PMI, the RI, and the CQI to the base station apparatus as feedback information. The method further includes, in the base station apparatus, calculating a first data rate of a case of performing SU-MIMO transmission based on the PMI transmitted from the mobile station apparatus as feedback and calculating a second data rate of a case of performing ZF MU-MIMO transmission based on the PMI. The method further includes selecting a transmission scheme corresponding to a higher data rate between the first and second data rates.

12 Claims, 9 Drawing Sheets

(56) References Cited

OTHER PUBLICATIONS

3GPP TSG RAN WG1 Meeting #60, R1-101218; "Performance of DL MU-MIMO Based on Implicit Feedback Scheme in LTE-Advanced"; NTT DoCoMo; San Francisco, USA; Feb. 22-26, 2010 (8 pages).

3GPP TSG RAN WG1 Meeting #47bhis, R1-070346; "Comparison of MU-MIMO feedback schemes with multiple UE receive antennas"; Philips; Sorrento, Italy; Jan. 15-19, 2007 (7 pages).

3GPP TR 25.913 V8.0.0; "3rd Generation Partnership Project; Technical Specification Group Radio Access Network; Requirements for Evolved Utra (E-UTRA) and Evolved UTRAN (E-UTRAN) (Release 8)"; Dec. 2008 (18 pages).

* cited by examiner (a)

(b)

(a)

(b)

MOBILE STATION APPARATUS, BASE STATION APPARATUS, MIMO SYSTEM AND DATA TRANSMISSION METHOD

TECHNICAL FIELD

The present invention relates to a mobile station apparatus, base station apparatus, MIMO system, and data transmission method, and more particularly, to a mobile station apparatus, base station apparatus, MIMO system, and data transmission method that support multi-antenna transmission.

BACKGROUND ART

In UNITS (Universal Mobile Telecommunications System) networks, for the purpose of improving spectral efficiency and further improving data rates, by adopting HSDPA (High Speed Downlink Packet Access) and HSUPA (High Speed Uplink Packet Access), it is performed exploiting maximum features of the system based on W-CDMA (Wideband Code Division Multiple Access). For the UMTS network, for the purpose of further increasing high-speed data rates, providing low delay and the like, Long Term Evolution (LTE) has been studied.

In the 3G system, a fixed band of 5 MHz is substantially used, and it is possible to achieve transmission rates of approximately maximum 2 Mbps in downlink. Meanwhile, in the LTE system, using variable bands ranging from 1.4 MHz to 20 MHz, it is possible to achieve transmission rates of maximum 300 Mbps in downlink and about 75 Mbps in uplink. Further, in the UMTS network, for the purpose of further increasing the wide-band and high speed, successor systems to LTE have been studied (for example, LTE Advanced (LTE-A)). For example, in LTE-A, it is scheduled to increase 20 MHz that is the maximum system band in LTE specifications to about 100 MHz.

Meanwhile, in LTE-scheme systems, MIMO (Multi Input Multi Output) systems are proposed as radio communication techniques for transmitting and receiving data using a plurality of antennas and improving a data rate (spectral efficiency) (for example, see Non-patent Document 1). In the MIMO systems, the transmitter/receiver is provided with a plurality of transmission/reception antennas, and simultaneously transmits different transmission information sequences from different transmission antennas. Meanwhile, the receiver side exploits the fact that different fading variations occur in between transmission and reception antennas, and divides the simultaneously-transmitted information sequences to detect, and it is possible to increase the data rate (spectral efficiency).

In the LTE-scheme systems, specified are Single User MIMO (SU-MIMO) in which transmission information sequences simultaneously transmitted from different transmission antennas are all for the same user and Multiple User MIMO (MU-MIMO) in which the transmission information sequences are for different users. In the SU-MIMO and MU-MIMO, the receiver side selects a phase/amplitude control amount (PMI: Precoding Matrix Indicator) to set on an antenna of the transmitter, and notifies the transmitter as feedback. The transmitter side performs precoding on each transmission antenna based on the PMI that is fed back from the receiver, and transmits transmission information sequences.

Meanwhile, in LTE-A scheme systems, to reserve flexibility of precoding on each transmission antenna in the transmitter, proposed is Zero Forcing MU-MIMO (ZF MU-MIMO) in which the receiver side transmits a CDI (Channel Direction Indicator) indicative of a channel state as feedback, and the transmitter side performs precoding on each transmission antenna based on the CDI, and transmits transmission information sequences (see Non-patent Document 2). In this ZU MU-MIMO, it is possible to transmit transmission information sequences to respective different users from eight transmission antennas scheduled in LTE-A, and to significantly increase the data rate when the spatial correlation between channels is high.

CITATION LIST

Non-Patent Literature

[Non-patent Literature 1] 3GPP TR 25.913 "Requirements for Evolved UTRA and Evolved UTRAN"
[Non-patent Literature 2] 3GPP R1-070346 Philips "Comparison of MU-MIMO feedback schemes with multiple UE receive antennas"

SUMMARY OF INVENTION

Technical Problem

In above-mentioned SU-MIMO, when the spatial correlation between channels is high, or the number of antennas on the receiver side is lower than the number of antennas on the transmitter side, it is not possible to derive the spatial dimension sufficiently, and it is difficult to improve the data rate. Meanwhile, in above-mentioned MU-MIMO, the number of transmissible different transmission information sequences is "2" at the maximum, and drastic improvements are not expected in the data rate. Further, the problem similar to SU-MIMO exists. Meanwhile, in ZF MU-MIMO, the PDI is transmitted as feedback instead of the PMI, and it is not possible to ensure compatibility with the LTE-scheme MIMO system. Furthermore, it is difficult to increase the data rate when the spatial correlation between channels is low.

The present invention was made in view of such circumstances, and it is an object of the invention to provide a mobile station apparatus, base station apparatus, MIMO system and data transmission method for enabling a data rate to be increased irrespective of whether the spatial correlation between channels is high or low, while ensuring compatibility with the LTE-scheme MIMO system.

Solution to Problem

A mobile station apparatus of the invention is a mobile station apparatus in a MIMO system in which a base station apparatus switches between SU-MIMO transmission and ZF MU-MIMO transmission based on feedback information from the mobile station apparatus to perform data transmission, and is characterized by having selecting section configured to select a PMI and an RI corresponding to the Hermitian transpose of a channel matrix indicative of channel characteristics, calculating section configured to calculate a CQI from the PMI, and feedback section configured to transmit the PMI, the RI and the CQI to the base station apparatus as the feedback information.

According to this configuration, since the PMI and RI reflecting channel characteristics (channel state) are transmitted to the base station apparatus as feedback, by providing the base station apparatus with the configuration for obtaining a CDI from the PMI, the base station apparatus is capable of using the PMI in selecting a precoding matrix in both SU-MIMO and ZF MU-MIMO, and it is thereby possible to improve the data rate irrespective of whether the spatial correlation between channels is high or low. Further, since the PMI is transmitted as the feedback information, it is possible to increase the data rate irrespective of whether the spatial correlation between channels is high or low, while ensuring compatibility with the LTE-scheme MIMO system.

A base station apparatus of the invention is a base station apparatus in a MIMO system in which the base station apparatus switches between SU-MIMO transmission and ZF MU-MIMO transmission based on feedback information from a mobile station apparatus to perform data transmission, and is characterized by having a first scheduler configured to calculate a first data rate of the case of performing SU-MIMO transmission, based on a PMI corresponding to the Hermitian transpose of a channel matrix indicative of channel characteristics, transmitted from a mobile station apparatus as feedback, a second scheduler configured to calculate a second data rate of the case of performing ZF MU-MIMO transmission based on the PMI, and transmission scheme selecting section configured to select a transmission scheme corresponding to a higher data rate between the first and second data rates.

According to this configuration, since the base station apparatus selects the transmission scheme corresponding to a higher data rate between the data rates of SU-MIMO transmission and ZF MU-MIMO transmission calculated based on the PMI reflecting channel characteristics (channel state), it is possible to perform data transmission while switching the transmission scheme as appropriate corresponding to the channel state, and it is thereby possible to increase the data rate irrespective of whether the spatial correlation between channels is high or low. Further, since the PMI is transmitted as the feedback information, it is possible to increase the data rate irrespective of whether the spatial correlation between channels is high or low, while ensuring compatibility with the LTE-scheme MIMO system.

A MIMO system of the invention is a MIMO system in which a base station apparatus switches between SU-MIMO transmission and ZF MU-MIMO transmission based on feedback information from a mobile station apparatus to perform data transmission, and is characterized by having the mobile station apparatus which selects a PMI and an RI corresponding to the Hermitian transpose of a channel matrix indicative of channel characteristics, calculates a CQI from the PMI, and transmits the PMI, the RI and the CQI to the base station apparatus as feedback information, and the base station apparatus which calculates a first data rate of the case of performing SU-MIMO transmission and a second data rate of the case of performing ZF MU-MIMO transmission based on the PMI transmitted from the mobile station apparatus as feedback, and selects a transmission scheme corresponding to a higher data rate between the first and second data rates.

According to this configuration, the mobile station apparatus transmits the PMI and RI reflecting channel characteristics (channel state) as feedback, the base station apparatus selects a transmission scheme corresponding to a higher data rate between the data rates of SU-MIMO transmission and ZF MU-MIMO transmission calculated based on the PMI, it is thereby possible to perform data transmission while switching the transmission scheme as appropriate corresponding to the channel state, and it is thus possible to increase the data rate irrespective of whether the spatial correlation between channels is high or low. Further, since the PMI is transmitted as the feedback information, it is possible to increase the data rate irrespective of whether the spatial correlation between channels is high or low, while ensuring compatibility with the LTE-scheme MIMO system.

A data transmission method of the invention is a data transmission method in which a base station apparatus switches between SU-MIMO transmission and ZF MU-MIMO transmission based on feedback information from a mobile station apparatus to perform data transmission, and is characterized by having the steps in the mobile station apparatus of selecting a PMI and an RI corresponding to the Hermitian transpose of a channel matrix indicative of channel characteristics, calculating a CQI from the PMI, and transmitting the PMI, the RI and the CQI to the base station apparatus as feedback information, and the steps in the base station apparatus of calculating a first data rate of the case of performing SU-MIMO transmission based on the PMI transmitted from the mobile station apparatus as feedback, calculating a second data rate of the case of performing ZF MU-MIMO transmission based on the PMI, and selecting a transmission scheme corresponding to a higher data rate between the first and second data rates.

According to this method, the mobile station apparatus transmits the PMI and RI reflecting channel characteristics (channel state) as feedback, the base station apparatus selects a transmission scheme corresponding to a higher data rate between the data rates of SU-MIMO transmission and ZF MU-MIMO transmission calculated based on the PMI, it is thereby possible to perform data transmission while switching the transmission scheme as appropriate corresponding to the channel state, and it is thus possible to increase the data rate irrespective of whether the spatial correlation between channels is high or low. Further, since the PMI is transmitted as the feedback information, it is possible to increase the data rate irrespective of whether the spatial correlation between channels is high or low, while ensuring compatibility with the LTE-scheme MIMO system.

Technical Advantage of the Invention

According to the invention, the mobile station apparatus transmits a PMI and RI reflecting channel characteristics (channel state) as feedback, the base station apparatus selects a transmission scheme corresponding to a higher data rate between the data rates of SU-MIMO transmission and ZF MU-MIMO transmission calculated based on the PMI, it is thereby possible to perform data transmission while switching the transmission scheme as appropriate corresponding to the channel state, and it is thus possible to increase the data rate irrespective of whether the spatial correlation between channels is high or low. Further, since the PMI is transmitted as the feedback information, it is possible to increase the data rate irrespective of whether the spatial correlation between channels is high or low, while ensuring compatibility with the LTE-scheme MIMO system.

DESCRIPTION OF EMBODIMENTS

Figure 1:
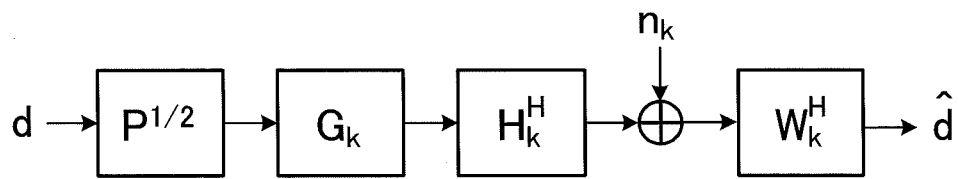
FIG. 1 is a conceptual diagram to explain signal processing on transmission data in an SU-MIMO system.
Figure 2:
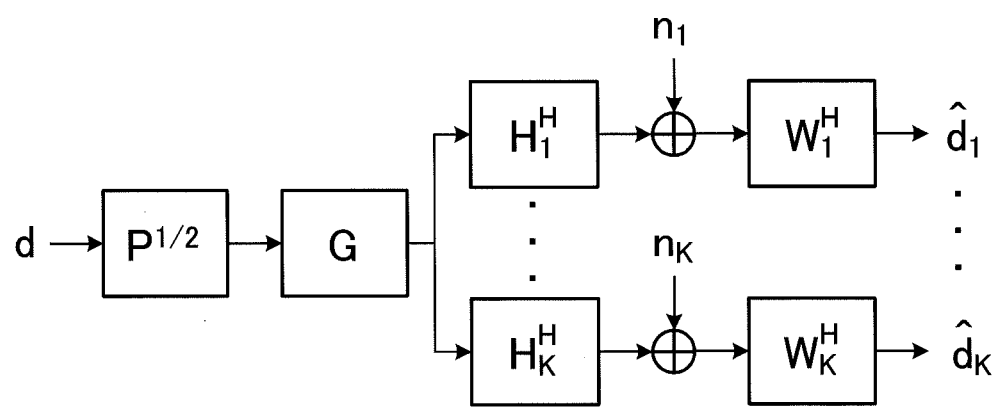
FIG. 2 is a conceptual diagram to explain signal processing on transmission data in an MU-MIMO system.

Signal processing on transmission data (transmission information sequence) in a general MIMO system will be described first before describing a MIMO system having a base station apparatus eNode B and mobile station apparatus UE according to the invention. FIG. 1 is a conceptual diagram to explain signal processing on transmission data in an SU-MIMO system, and FIG. 2 is a conceptual diagram to explain signal processing on transmission data in an MU-MIMO system. In addition, in the following description, "k" represents an identification number (UE identifier) of a mobile station apparatus UE, and "$P^{1/2}$" represents a transmission power control matrix. Further, "$G_k$" represents a precoding matrix for a kth mobile station apparatus UE. Furthermore, "$H_k^H$" represents a channel matrix in the kth mobile station apparatus UE, and "$W_k^H$" represents a reception filter (weight) matrix for the kth mobile station apparatus UE. Still furthermore, "$n_k$" represents noise added to the kth mobile station apparatus UE on the propagation path.

In the SU-MIMO system, with respect to transmission data d allocated corresponding to the number of transmission layers indicated from an upper station apparatus, a base station apparatus eNode B controls the transmission power with a transmission power control matrix $P^{1/2}$, and then, controls (shifts) the phase/amplitude amount with a precoding matrix $G_k$. In addition, the precoding matrix $G_k$ is selected based on feedback information transmitted from a mobile station apparatus UE as feedback. The transmission data d with the phase/amplitude shifted is converted into a signal with a radio frequency band, and is transmitted from a plurality of transmission antennas to MIMO channels that are propagation paths as transmission signals. At this point, the transmission data on the MIMO channels is expressed by a channel matrix $H_k^H$. The transmission signals provided with noise $N_k$ on the MIMO channels are received in a plurality of reception antennas in the mobile station apparatus UE, and then, are subjected to filtering processing in a filtering processing section (herein, MMSE (Minimum Mean Square Error) filter) with a reception filter matrix $W_k^H$, and the original transmission data d is acquired.

Meanwhile, also in the MU-MIMO system, with respect to transmission data d allocated corresponding to the number of transmission layers indicated from an upper station apparatus, a base station apparatus eNode B controls the transmission power with a transmission power control matrix $P^{1/2}$, and then, controls (shifts) the phase/amplitude amount with a precoding matrix $G_k$. The transmission data d with the phase/amplitude shifted is converted into a signal with a radio frequency band, and is transmitted from a plurality of transmission antennas to MIMO channels that are propagation paths as transmission signals. At this point, the transmission data on the MIMO channels is expressed respectively using channel matrixes $H_1^H$ to $H_k^H$. The transmission signals provided with noise $N_k$ on the MIMO channels are received in reception antennas in a plurality of mobile station apparatuses UE, and then, are subjected to filtering processing in filtering processing sections (herein, MMSE filters) with reception filter matrixes $W_1^H$ to $W_k^H$, and the original transmission data $d_1$ to $d_k$ is acquired.

The principal processing performed in the mobile station apparatus UE in such SU-MIMO system and MU-MIMO system includes quantizing processing (hereinafter, referred to as "quantization processing") and processing for calculating a CQI (hereinafter, referred to as "CQI calculation processing"), as the processing for calculating feedback information. In the quantization processing in the LTE-scheme MIMO system (SU-MIMO system and MU-MIMO system), a precoding vector and rank are selected.

In the quantization processing in the LTE-A-scheme ZF MU-MIMO system, a channel direction is selected. Meanwhile, the principal processing performed in the base station apparatus eNode B includes processing (hereinafter, referred to as "CQI adjustment processing") for adjusting a CQI for scheduling, and processing (hereinafter, referred to as "precoding vector calculation processing") for calculating precoding vectors for users undergoing scheduling, as the processing for performing scheduling using the feedback information from the mobile station apparatuses UE. In addition, the CQI adjustment processing is performed in MU-MIMO and the like when necessary.

Figure 3:
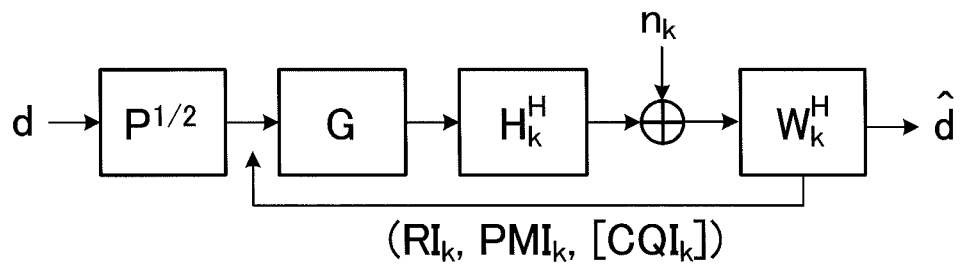
FIG. 3 is a conceptual diagram to explain principal processing content in an LTE-scheme SU-MIMO system.
Figure 4:
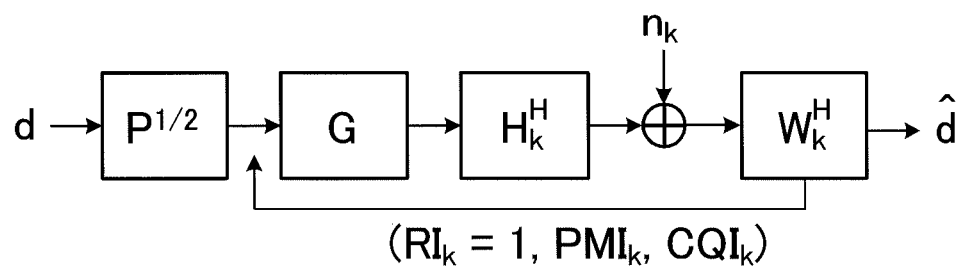
FIG. 4 is a conceptual diagram to explain principal processing content in an LTE-scheme MU-MIMO system.
Figure 5:
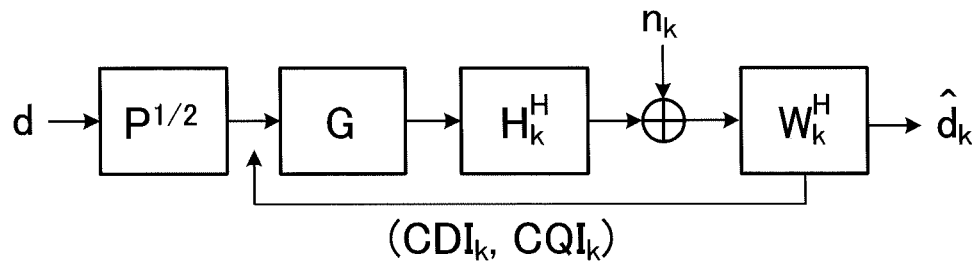
FIG. 5 is a conceptual diagram to explain principal processing content in an LTE-A-scheme ZF MU-MIMO system.

Described below is the contents of principal processing in the LTE-scheme SU-MIMO system, MU-MIMO system and LTE-A-scheme ZFMU-MIMO system. FIGS. 3 and 4 are conceptual diagrams to explain the principal processing contents in the LTE-scheme SU-MIMO system and MU-MIMO system, respectively. FIG. 5 is a conceptual diagram to explain the principal processing content in the LTE-A-scheme ZF MU-MIMO system. In addition, for convenience in description, a single mobile station apparatus UE is shown in the MU-MIMO system and ZF MU-MIMO system as shown in FIGS. 4 and 5.

In the LTE-scheme SU-MIMO system as shown in FIG. 3, in quantization of a precoding vector, a precoding codebook is used. The precoding codebook beforehand defines N precoding matrixes for each of streams corresponding to the number of reception antennas. Both the mobile station apparatus UE and the base station apparatus eNode B hold common precoding codebooks. The kth mobile station apparatus UE in the LTE-scheme SU-MIMO system selects the optimal number of streams (rank number), while selecting optimal precoding matrixes respectively. The optimal number of streams is selected as an RI (Rank Indicator)$_k$, and the precoding matrix is selected as a $PMI_k$. Then, the CQI of each of the streams is calculated. Meanwhile, the base station apparatus eNode B selects a user of the maximum data rate.

In the quantization processing in the mobile station apparatus UE in the LTE-scheme SU-MIMO system as shown in FIG. 3, a reception filter matrix $W_{L,n,l}^H$ of each reception signal is calculated by (Eq.1).

$$w_{L,n,l}^H = \frac{w'^H_{L,n,l}}{\|w'^H_{L,n,l}\|} \quad \text{(Eq. 1)}$$

Herein, "L" represents the rank number, "n" represents an index of the precoding codebook, "l" represents an index (l=1, ..., L) of a transmission stream. In addition, $W'^H_{L,n,l}$ is obtained by (Eq.2).

$$w'^H_{L,n,l} = e_l^T P^{1/2} G^H_{L,n} H_k (H_k^H G_{L,n} P G_{L,n}^H H_k + I)^{-1} \quad \text{(Eq.2)}$$

Herein, "$e_l$" is a vector to extract only vector components of the matrix in the lth column or lth row, and "I" represents an identity matrix.

Then, based on the above-mentioned reception filter matrix $W_{L,n,l}^H$, $\text{SINR}_{L,n,l}$ is calculated by (Eq.3).

$$\text{SINR}_{L,n,l} = \frac{\frac{p_{Tx}}{L}|w_{L,n,l}^H H_k^H G_{L,n} e_l|^2}{1 + \frac{p_{Tx}}{L}\sum_{l' \neq l}^L |w_{L,n,l}^H H_k^H G_{L,n} e_{l'}|^2} \quad \text{(Eq. 3)}$$

Herein, "$P_{TX}$" represents total transmission power of the base station apparatus eNode B.

Further, based on the above-mentioned $\text{SINR}_{L,n,l}$, a combination of RI and PMI that maximizes a data rate is calculated by (Eq.4).

$$\{RI_k, PMI_k\} = \underset{1 \leq L \leq N_R, 1 \leq n \leq N}{\text{argmax}} \sum_{l=1}^L \log(1 + \text{SINR}_{L,n,l}) \quad \text{(Eq. 4)}$$

Herein, "$RI_k$" represents an optimal rank of the kth mobile station apparatus UE, and "$PMI_k$" represents an optimal PMI of the kth mobile station apparatus UE. Further, "$N_R$" represents the number of reception antennas, and "N" represents the size of the precoding codebook.

In the CQI calculation processing in the mobile station apparatus UE, a value ($CQI_k$) of the CQI of each stream is calculated by (Eq.5) in relation to the combination of $RI_k$ and $PMI_k$ obtained by (Eq.4).

$$[CQI_k] = [\text{SINR}_{RI_k, PMI_k, 1}, \ldots, \text{SINR}_{RI_k, PMI_k, RI_k}] \quad \text{(Eq.5)}$$

In addition, in the LTE-scheme SU-MIMO system, the number of CQIs is determined to be maximum two, but in the Description, for convenience in description, the explanation is given while assuming that the number is the same as the rank number.

Thus calculated $RI_k$, $PMI_k$ and $CQI_k$ are transmitted to the base station apparatus eNode B as feedback information. The base station apparatus eNode B in the LTE-scheme SU-MIMO system does not perform the CQI adjustment processing. In the precoding vector calculation processing in the base station apparatus eNode B, based on the $RI_k$ and $PMI_k$ included in the feedback information, the precoding matrix G is calculated by (Eq.6), while the transmission power control matrix P is calculated by (Eq.7).

$$G = G_{RI_k, PMI_k} \quad \text{(Eq. 6)}$$

$$P = \frac{p_{Tx}}{RI_k} I \quad \text{(Eq. 7)}$$

The LTE-scheme MU-MIMO system corresponds to a simplified extension system of the SU-MIMO with a restriction for assigning one stream to one mobile station apparatus UE imposed. Therefore, except the restriction for assigning one stream to one mobile station apparatus UE, signal processing common to the SU-MIMO system is performed. A precoding codebook that beforehand defines N precoding matrixes for each of streams corresponding to the number of reception antennas is used in quantization of a precoding vector. The mobile station apparatus UE in the LTE-scheme MU-MIMO system selects an optimal precoding matrix for one stream ($RI_k=1$), while calculating a CQI of the stream. Meanwhile, the base station apparatus eNode B selects two users of maximum data rates. In addition, when scheduling is performed on two users, the CQI is adjusted.

In the quantization processing in the mobile station apparatus UE in the LTE-scheme MU-MIMO system as shown in FIG. 4, $SNR_n$ is calculated by (Eq.8).

$$SNR_n = P_{Tx}\|H_k^H g_n\|^2 \quad \text{(Eq.8)}$$

Herein, "$g_n$" is defined as described in (Eq.9).

$$g_n = G_{l,n} \quad \text{(Eq.9)}$$

In other words, $g_n$ is defined as $G_{l,n}$ representing a precoding matrix of the nth precoding codebook index of rank 1.

Then, based on the above-mentioned $SNR_n$, $PMI_k$ is calculated by (Eq.10).

$$PMI_k = \underset{1 \leq n \leq N}{\text{argmax}} \log(1 + SINR_n) \quad \text{(Eq. 10)}$$

In the CQI calculation processing in the kth mobile station apparatus UE, based on the $PMI_k$ obtained by (Eq.10), a value ($CQI_k$) of the CQI of each stream is calculated by (Eq.11).

$$CQI_k = SNR_{PMI_k} \quad \text{(Eq.11)}$$

Thus calculated $RI_k$ (in this case, $RI_k$ is beforehand determined to be "1"), $PMI_k$ and $CQI_k$ are transmitted to the base station apparatus eNode B as feedback information. In the CQI adjustment processing in the base station apparatus eNode B, the $CQI_k$ included in such feedback information is adjusted by (Eq.12) ($CQI_k'$). This is because the $CQI_k$ from each of a plurality (two) of mobile station apparatuses UEs is not in consideration of existence of the other mobile station apparatus UE, and the base station apparatus eNode B needs to estimate multi-access interference based thereon.

$$CQI_k' = \frac{CQI_k}{1 + f_k \cdot CQI_k} \quad \text{(Eq. 12)}$$

In this case, in the $CQI_k$ fed back from each of two mobile station apparatuses UEs, the multi-access interference amount is estimated by "$f_k \cdot COI_k$" in (Eq.12). Herein, "$f_k$" indicates a scalar value, and in the case of "0", interference is ignored.

In addition, herein, the case of obtaining the $CQI_k'$ by (Eq.12) is shown, and it is also possible to obtain the $CQI_k'$ corresponding to the content of a beforehand determined table (look-up table).

In the precoding vector calculation processing in the base station apparatus eNode B, based on the $RI_k$ and $PMI_k$ included in such feedback information, the precoding matrix G is calculated by (Eq.13), while the transmission power control matrix P is calculated by (Eq.14).

$$G = \begin{bmatrix} G_{RI_k, PMI_k}, G_{RI_{k'}, PMI_{k'}} \end{bmatrix} \quad \text{(Eq. 13)}$$

$$P = \frac{p_{Tx}}{2} I \quad \text{(Eq. 14)}$$

In the LTE-A-scheme ZF MU-MIMO system as shown in FIG. 5, as distinct from the LTE-scheme MU-MIMO, the mobile station apparatus transmits the $CDI_k$ to the base station apparatus eNode B as feedback information, instead of the $RI_k$ and $PMI_k$. Herein, the "$CDI_k$" indicates a CDI (Channel Direction Indicator) of the kth mobile station apparatus UE. Based on the $CDI_k$ and $CQI_k$ that are thus transmitted as feedback, the base station apparatus eNode B forms transmission streams (transmission beams) hard to interfere to a plurality of mobile station apparatuses UE.

In the LTE-A-scheme ZFMU-MIMO system, a channel codebook that beforehand defines N channel vectors is used in quantization of a CDI. Both the mobile station apparatus UE and the base station apparatus eNode B hold common channel codebooks. A mobile station apparatus UE in the LTE-A-scheme ZF MU-MIMO system selects an optimal channel direction ($CDI_k$), while calculating a CQI with a multi-access interference amount estimated. Meanwhile, the base station apparatus eNode B selects users of the maximum data rate. Further, the CQI is adjusted according to the number of users targeted for scheduling.

Figure 6:
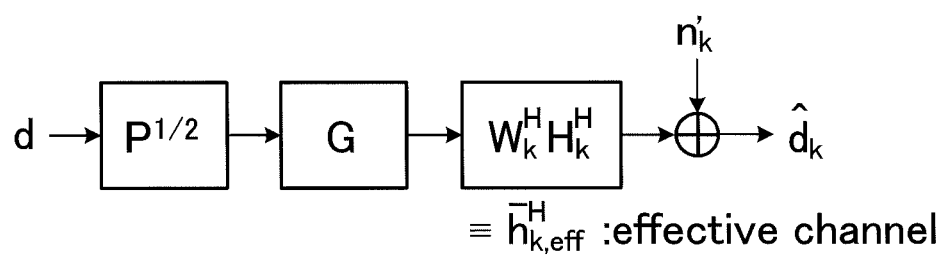
FIG. 6 shows a processing conceptual diagram equivalent to the processing conceptual diagram of the ZF MU-MIMO system as shown in FIG. 5.

FIG. 6 shows a processing conceptual diagram equivalent to the processing conceptual diagram of the ZF MU-MIMO system as shown in FIG. 5. Herein, "$W_k^H H_k^H$" as shown in FIG. 6 is defined as an effective channel: $\bar{h}_{k,eff}^H$.

In the quantization processing in the mobile station apparatus UE in the LTE-A-scheme ZF MU-MIMO system as shown in FIG. 6, as shown in (Eq.15), the channel matrix $H_k$ is decomposed into a unitary matrix $Q_k$ and an upper triangular matrix $R_k$.

$$H_k = Q_k R_k \quad \text{(Eq.15)}$$

Then, the $CDI_k$ is calculated by (Eq.16), while the effective channel $\bar{h}_{k,eff}^{(Q)}$ is calculated by (Eq.17).

$$CDI_k = \underset{1 \leq l' \leq N}{\operatorname{argmax}} \|Q_k^H u_{l'}\| \quad \text{(Eq. 16)}$$

$$\bar{h}_{k,eff}^{(Q)} = u_{CDI_k} \quad \text{(Eq. 17)}$$

Herein, "u" represents a quantization vector of the effective channel, and "l'" represents an index of the CDI selected from the channel codebook In other words, the quantization vector of the effective channel corresponding to the $CDI_k$ obtained by (Eq.16) is obtained as the $\bar{h}_{k,eff}^{(Q)}$.

In the CQI calculation processing in the mobile station apparatus UE, the $CQI_k$ is calculated by (Eq.18).

$$CQI_k = \frac{\frac{P_{Tx}}{N_T} \|h_{k,eff}\|^2 \cos^2 \theta_k}{1 + \frac{P_{Tx}}{N_T} \|h_{k,eff}\|^2 \sin^2 \theta_k} \quad \text{(Eq. 18)}$$

Herein, by calculation of the denominator part of the right side in (Eq.18), a multi-access interference amount from a quantization error is estimated. In other words, in the ZF MU-MIMO system as shown in FIG. 6, it is possible to estimate the multi-access interference amount in the CQI calculation processing in the mobile station apparatus UE.

Thus calculated $CDI_k$ and $CQI_k$ are transmitted to the base station apparatus eNode B as feedback information. In the CQI adjustment processing in the base station apparatus eNode B, the $CQI_k'$ is adjusted by (Eq.19).

$$CQI_k' = CQI_k \frac{N_T}{L \|g_k\|^2} \quad \text{(Eq. 19)}$$

Herein, "$g_k$" represents a precoding weight vector of the kth column in the precoding matrix G calculated by (Eq.21).

In the precoding vector calculation processing in the base station apparatus eNode B, the actual channel $H_{eff}^{(Q)}$ is calculated by (Eq.20), while the precoding matrix G is calculated based on the actual channel $H_{eff}^{(Q)}$ by (Eq.21). Further, the transmission power control matrix $p_k$ is calculated by (Eq.22).

$$H_{eff}^{(Q)} = [\bar{h}_{1,eff}^{(Q)} \ldots \bar{h}_{L,eff}^{(Q)}] \quad \text{(Eq. 20)}$$

$$G = H_{eff}^{(Q)} \left( H_{eff}^{(Q)H} H_{eff}^{(Q)} \right)^{-1} \quad \text{(Eq. 21)}$$

$$p_k = \frac{P_{Tx}}{L \|g_k\|^2} \quad \text{(Eq. 22)}$$

In such a ZF MU-MIMO system, compatibility with the LTE-scheme MIMO system is not ensured, but as distinct from the LTE-scheme MU-MIMO system, it is possible to set the number of transmission streams at "3" or more, and to drastically increase the data rate. Further, the system is suitable for increasing the data rate in the case where the spatial correlation between channels is high. Therefore, while it is possible to increase the data rate in the case where the spatial correlation between channels is high, by combining with SU-MIMO that is suitable for increasing the data rate in the case where the spatial correlation between channels is low, it is possible to increase the data rate irrespective of whether the spatial correlation between channel is high or low. From such a viewpoint, the inventors of the invention conceived the present invention.

In other words, it is the gist of the invention to reflect the content of the feedback information (CDI) in ZF MU-MIMO in the feedback information (PMI) in the LTE-scheme MU-MIMO system, while dynamically switching between SU-MIMO and ZF MU-MIMO. By this means, it is possible to increase the data rate irrespective of whether the spatial correlation between channels is high or low, while ensuring compatibility with the LTE-scheme MIMO system.

Figure 7:
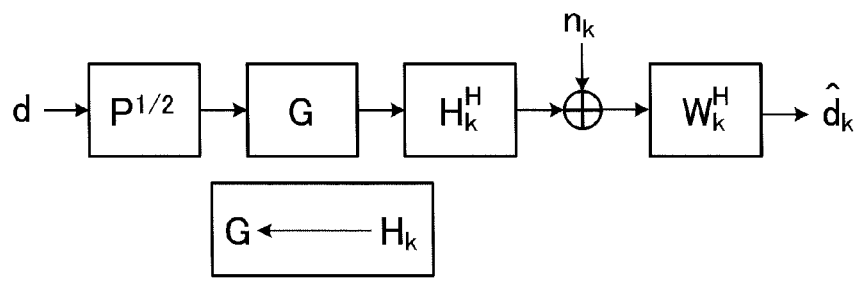
FIG. 7 is a conceptual diagram to explain signal processing on transmission data in a MIMO system according to the invention.

An Embodiment of the invention will specifically be described below with reference to accompanying drawings. In a MIMO system according to the invention, SU-MIMO and ZF MU-MIMO is dynamically switched. In the following description, for convenience in description, the MIMO system according to the invention is referred to as a "complex MIMO system". FIG. 7 is a conceptual diagram to explain signal processing on transmission data in the complex MU-MIMO system according to the invention.

In a ZF MU-MIMO system, a mobile station apparatus UE estimates a channel state of a MIMO channel, selects a CDI corresponding to the channel state, and transmits the CDI to the base station apparatus eNode B as feedback. Based on the CDI, the base station apparatus eNode B controls (shifts) the phase/amplitude amount of transmission data d to a plurality of mobile station apparatuses UEs. In the complex MIMO system according to the invention, instead of directly transmitting the CDI corresponding to the channel state as feedback, a PMI reflecting the channel state is transmitted as feedback. Based on the PMI, the base station apparatus eNode M selects a precoding matrix G, and controls the phase/amplitude amount of the transmission data d. More specifically, as one method, it is considered that as shown in FIG. 7, the base station apparatus eNode B uses the Hermitian transpose ($H_k$) of a channel matrix $H_k^H$ of a MIMO channel as a precoding matrix G, and controls the phase/amplitude amount of the transmission data d.

In the case of thus using the Hermitian transpose $H_k$ of the channel matrix $H_k^H$ as a precoding matrix G, the precoding matrix G without interference between streams being considered is selected. However, in SU-MIMO, interference between streams is canceled in the filtering processing section (MMSE filter) of the mobile station apparatus UE. Therefore, also in the case of selecting the precoding matrix G without interference between streams being considered in the complex MIMO system according to the invention, it is conceivable that interference between streams does not affect the data rate significantly.

In the complex MIMO system according to the invention, to ensure compatibility with the LTE-scheme MIMO system, the mobile station apparatus UE transmits the PMI as feedback information. Accordingly, in order to use the Hermitian transpose $H_k$ of the channel matrix $H_k^H$ as the precoding matrix G, it is necessary to conform the Hermitian transpose $H_k$ of the channel matrix $H_k^H$ to the registration form of an entry of the precoding codebook. In other words, the entry of the precoding codebook is orthonormal, and in contrast thereto, the channel matrix $H_k^H$ is generally not orthonormal. Accordingly, in order to use the Hermitian transpose $H_k$ of the channel matrix $H_k^H$ as the precoding matrix G, it is necessary to orthonormalize the Hermitian transpose $H_k$ of the channel matrix $H_k^H$ that is not orthonormal.

As a technique for orthonormalizing the Hermitian transpose $H_k$ of the channel matrix $H_k^H$ that is not orthonormal, for example, QR decomposition processing is considered. In the QR decomposition processing, by decomposing the Hermitian transpose $H_k$ of the channel matrix $H_k^H$ into a unitary matrix $Q_k$ and an upper triangular matrix $R_k$, it is possible to extract the unitary element of the Hermitian transpose $H_k$ of the channel matrix $H_k^H$. In the unitary matrix $Q_k$, matrix elements are orthonormalized and reflect the channel matrix $H_k^H$. Therefore, by using, as the precoding matrix G, the unitary matrix $Q_k$ obtained from the Hermitian transpose $H_k$ of the channel matrix $H_k^H$ by the QR decomposition processing, it is possible to obtain substantially the same effect as using the Hermitian transpose $H_k$ of the channel matrix $H_k^H$ as the precoding matrix G.

Figure 8:
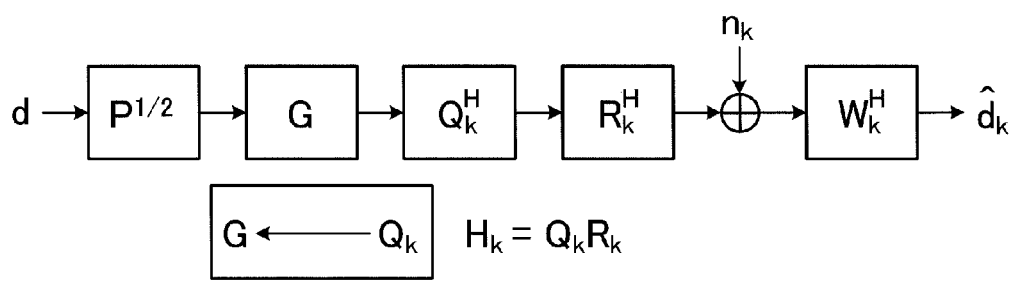
FIG. 8 is a conceptual diagram to explain signal processing in the case of using a unitary matrix reflecting a channel matrix as a precoding matrix in the MIMO system according to the invention.

FIG. 8 is a conceptual diagram to explain signal processing in the case of using the unitary matrix $Q_k$ reflecting the channel matrix $H_k^H$ as the precoding matrix G in the MIMO system according to the invention. FIG. 8 shows the signal processing in the case of QR-decomposing the channel matrix $H_k^H$ into the unitary matrix $Q_k^H$ and the upper triangular matrix $R_k^H$, and obtaining respective Hermitian transposes $Q_k$ and $R_k$, in order to obtain the unitary matrix $Q_k$ reflecting the channel matrix $H_k^H$.

In addition, herein, as the technique for orthonormalizing the Hermitian transpose $H_k$ of the channel matrix $H_k^H$, the case of using the QR decomposition processing is shown, but the technique is not limited to the QR decomposition processing, and is capable of being modified as appropriate. For example, it is possible to use Singular Value Decomposition (SVD) processing. Also in the case of thus using the SVD processing, by using the unitary matrix obtained by the SVD processing as the precoding matrix G, it is possible to obtain substantially the same effect as using the Hermitian transpose $H_k$ of the channel matrix $H_k^H$ as the precoding matrix G.

In the quantization processing in the mobile station apparatus UE in the complex MIMO system according to the invention, since it is necessary to select a PMI reflecting the channel state of the MIMO channel, precoding weights approximating to the unitary matrix $Q_k$ reflecting the channel matrix $H_k^H$ are selected from the precoding codebook. As the processing for selecting the precoding weights, for example, performed is computation processing (hereinafter, referred to as "minimum chordal distance computation processing") that minimizes the chordal distance. A precoding vector ($PMI_{k,L}$) approximating the unitary matrix $Q_k$ is calculated by (Eq.23).

$$PMI_{k,L} = \underset{1 \le n \le N}{\operatorname{argmin}} d_{chord}(Q_k(:, 1:L), G_{L,n}) \qquad \text{(Eq. 23)}$$

Herein, the chordal distance between two matrixes A and B is calculated by (Eq.24).

$$d_{chord}(A, B) = \frac{1}{\sqrt{2}} \|AA^H - BB^H\|_F \qquad \text{(Eq. 24)}$$

Then, based on thus calculated precoding vector ($PMI_{k,L}$), the $RI_k$ and $PMI_k$ that maximize the data rate are calculated by (Eq.25) and (Eq.26), respectively.

$$RI_k = \underset{1 \le L \le N_R}{\operatorname{argmax}} \sum_{l=1}^{L} \log(1 + SINR_{L,PMI_{k,L},l}) \qquad \text{(Eq. 25)}$$

$$PMI_k = PMI_{k,RI_k} \qquad \text{(Eq. 26)}$$

In addition, the reception filter matrix $W_{L,n,l}^H$, and $SINR_{L,n,l}$ in the quantization processing in the mobile station apparatus UE in the complex MIMO system according to the invention are calculated by (Eq.1) to (Eq.3) as in above-mentioned SU-MIMO. Further, in the CQI calculation processing, a value ($CQI_k$) of the CQI of each stream is calculated by (Eq.5) in relation to the combination of RI and PMI obtained by (Eq.25) and (Eq.26). Thus calculated $RI_k$, $PMI_k$ and $CQI_k$ are transmitted to the base station apparatus eNode B as feedback information.

The base station apparatus eNode B in the complex MIMO system according to the invention dynamically switches between SU-MIMO transmission and ZF MU-MIMO transmission, according to a result of comparison between a data rate in the case of performing SU-MIMO transmission and a data rate in the case of performing ZF MU-MIMO transmission. Therefore, two data rates of SU-MIMO and ZF MU-MIMO transmission are calculated, and are compared with each other, and MIMO transmission of a higher data rate is selected.

In the case of calculating a data rate in SU-MIMO transmission, as in SU-MIMO described previously, the base station apparatus eNode B does not perform the CQI adjustment processing. In the precoding vector calculation processing, based on the $RI_k$ and $PMI_k$ included in the feedback information, the precoding matrix G is calculated by (Eq.6), while the transmission power control matrix P is calculated by (Eq.7).

Then, subsequent to the precoding vector calculation processing, the base station apparatus eNode B in the complex MIMO system according to the invention performs processing (hereinafter, referred to as "SU-MIMO data rate calculation processing") for calculating a data rate in SU-MIMO transmission. In the SU-MIMO data rate calculation processing, a data rate $R_{sum}^{(SU)}$ is calculated by (Eq.27).

$$R_{sum}^{(SU)} = \sum_{l=1}^{RI_{s(SU)}} \log(1 + CQI_{s(SU),l}) \quad \text{(Eq. 27)}$$

Herein, "$s^{(SU)}$" represents a user (mobile station apparatus UE) (hereinafter, referred to as a "schedule user") undergoing scheduling, and is selected by (Eq.28).

$$s^{(SU)} = \underset{1 \leq k \leq K}{\operatorname{argmax}} \sum_{l=1}^{RI_k} \log(1 + CQI_{k,l}) \quad \text{(Eq. 28)}$$

Meanwhile, in the case of calculating a data rate in ZF MU-MIMO transmission, prior to the CQI adjustment processing, the base station apparatus eNode B performs processing (hereinafter, referred to as "CDI conversion processing") for converting the PMI included in the feedback information into a CDI. The reason why the PMI is thus converted into the CDI is to allow the base station apparatus eNode B to form transmission streams (transmission beams) hard to interfere to a plurality of mobile station apparatuses UE based on the CDI.

In addition, in the complex MIMO system according to the invention, it is the premise to adopt the same feedback scheme as SU-MIMO so as to ensure compatibility with the LTE-scheme MIMO system, and therefore, the mobile station apparatus UE does not always transmit the PMI and RI with rank 1 assumed as feedback. Meanwhile, in ZF MU-MIMO, the rank (RI) per mobile station apparatus UE is transmitted in rank 1 in principle. Therefore, required is a mechanism for obtaining a PMI (CDI) of rank 1 for ZF MU-MIMO using a PMI and RI that are not limited to rank 1. The above-mentioned CDI conversion processing corresponds to the processing to actualize such a mechanism.

In the CDI conversion processing, a stream with the highest CQI is selected from among streams by (Eq.29) and (Eq.30), and a precoding vector (elements of the precoding matrix Gk in the lth row) corresponding to the stream is defined as an effective channel. By this means, it is possible to select the PMI nearest the channel state (channel matrix $H_k^H$) from PMIs transmitted as feedback.

$$\overline{h}_{k,eff}^{(Q)} = G_k(:,l) \quad \text{(Eq. 29)}$$

$$l = \underset{l'=1,\ldots,RI_k}{\operatorname{argmax}} CQI_{k,l'} \quad \text{(Eq. 30)}$$

Next, in the CDI conversion processing, from the $CQI_{k,l}$ transmitted as feedback with the rank $RI_k$ of SU-MIMO assumed, an error of the CQI occurring in transmission in rank 1 per mobile station apparatus UE in ZF MU-MIMO is corrected by (Eq.31).

$$CQI'_k = CQI_{k,l} \cdot RI_k \quad \text{(Eq.31)}$$

In (Eq.31), the CQI ($CQI_k'$) for ZF MU-MIMO is calculated by multiplying the CQI ($CQI_{k,l}$) for SU-MIMO by the rank number ($RI_k$) that is fed back. By this means, the CQI in ZF MU-MIMO transmission is calculated approximately.

In addition, herein, described is the case of calculating the CQI ($CQI_k'$) for ZF MU-MIMO by multiplying the CQI ($CQI_{k,l}$) for SU-MIMO by the rank number ($RI_k$) that is fed back, but the method for calculating the CQI ($CQI_k'$) for ZF MU-MIMO is not limited thereto, and is capable of being modified as appropriate.

In the CQI adjustment processing in the base station apparatus eNode B, the CQI' obtained by (Eq.31) is adjusted corresponding to the relationship between the rank number L (the number of streams) and the number $N_R$ of reception antennas. The reason why the CQI' is adjusted herein is that the CQI' has a significant effect on calculation of the data rate in the complex MIMO system for dynamically switching between SU-MIMO and ZF MU-MIMO. More specifically, a CQI" is calculated by adjusting the CQI' by (Eq.32). In addition, in (Eq.32), "$\theta_{max}$" is set at 5°.

$$CQI_k'' = \begin{cases} CQI_k' & L \leq N_R \\ \dfrac{N_T CQI_k' \cos^2(\theta_{max}/2)}{N_T(2-\cos(\theta_{max}/2))^2 +} & L > N_R \\ CQI_k' \sin^2(\theta_{max}/2) & \end{cases} \quad \text{(Eq. 32)}$$

In (Eq.32), the CQI' is maintained without being adjusted in the case where the rank number L is lower than or equal to the number $N_R$ of reception antennas, while being adjusted only in the case where the rank number L is higher than the number $N_R$ of reception antennas. The reason why the CQI' is adjusted in this manner is that it is conceivable that interference can be canceled by the MMSE filter in the mobile station apparatus UE in the case where the rank number L is lower than or equal to the number $N_R$ of reception antennas, while it is difficult to cancel interference by the MMSE filter in the case where the rank number L is higher than the number $N_R$ of reception antennas. By thus adjusting the CQI', also in the case where the rank number L is higher than the number $N_R$ of reception antennas, it is possible to make more actual estimations with consideration given to the effect that it is not possible to completely cancel interference between streams by the MMSE filter.

In the precoding vector calculation processing in the base station apparatus eNode B, as in ZF MU-MIMO as described previously, the actual channel $H_{eff}^{(Q)}$ is calculated by (Eq.20), while the precoding matrix G is calculated by (Eq.21). Further, a diagonal element $p_k$ of the transmission power control matrix P is calculated by (Eq.22).

Subsequent to the precoding vector calculation processing, the base station apparatus eNode B in the complex MIMO system according to the invention performs processing (hereinafter, referred to as "ZF MU-MIMO data rate calculation processing") for calculating a data rate $R_{sum}^{(MU)}$ in ZF MU-MIMO transmission. In the ZF MU-MIMO data rate calculation processing, the data rate $R_k$ of each transmission stream is calculated by (Eq.33) based on the CQI" adjusted by (Eq.32).

$$R_k = \log\left(1 + \frac{CQI_k''}{L\|g_k\|^2}\right) \quad \text{(Eq. 33)}$$

The data rate $R_{sum}^{(MU)}$ in ZF MU-MIMO transmission is calculated by the sum of thus calculated data rates $R_k$ of respective streams.

In addition, in calculating the data rate $R_{sum}^{(MU)}$, in the base station apparatus eNode B, the data rate $R_k$ is adjusted corresponding to the relationship between the rank number L (the number of streams) and the number $N_R$ of reception antennas. The reason why the data rate $R_k$ is adjusted in this manner is that it is conceivable that interference is hard to cancel by the MMSE filter in the case where the rank number L is higher than the number $N_R$ of reception antennas, and affects the calculation result of the data rate $R_k$. By thus adjusting the data rate $R_k$, also in the case where the rank number L is higher than the number $N_R$ of reception antennas, it is possible to obtain a suitable data rate $R_k$. Such an adjustment of the data rate $R_k$ is made by (Eq.34).

$$R_k' = \begin{cases} R_k & L \leq N_R \\ c_k \cdot R_k & L > N_R \end{cases} \quad \text{(Eq. 33)}$$

Herein, "$R_k'$" represents an adjusted data rate $R_k$. In (Eq.34) the data rate $R_k$ is maintained without being adjusted in the case where the rank number L is lower than or equal to the number $N_R$ of reception antennas, while being adjusted by a rate adjustment value $C_k$ only in the where the rank number L is higher than the number $N_R$ of reception antennas.

Herein, the rate adjustment value $C_k$ is calculated by (Eq.35).

$$c_k = f(|r_{Tx,k}|, CQI_k, L-N_R) \quad \text{(Eq.35)}$$

In other words, the rate adjustment value $C_k$ is calculated by the function of the spatial correlation between transmission antennas, $CQI_k$, and the number of streams exceeding the number $N_R$ of reception antennas. For example, the functions are obtained by simulation actual results, and are prepared as a look-up table. By adjusting the data rate $R_k$ corresponding to the table (the rate adjustment value $C_k$ defined in the table) based on the simulation actual results, it is possible to obtain the data rate $R_k$ reflecting the channel state on the MIMO channel.

In addition, shown herein is the case of calculating the rate adjustment value $C_k$ by the function of the spatial correlation between transmission antennas, $CQI_k$, and the difference between the rank number L and the number $N_R$ of reception antennas, but the method of calculating the rate adjustment value $C_k$ is not limited thereto, and is capable of being modified as appropriate. For example, it is possible to calculate the value as the function with consideration given to the used precoding book, the total number of users in the system and the total number of transmission antennas and reception antennas.

Then, the base station apparatus eNode B performs processing (hereinafter, referred to as "transmission scheme selection processing") for comparing the data rate $R_{sum}^{(SU)}$ obtained by the SU-MIMO data rate calculation processing with the data rate $R_{sum}^{(MU)}$ obtained by the ZF MU-MIMO data rate calculation processing and selecting MIMO transmission of the hither data rate. By the transmission scheme selection processing, selected is MIMO transmission that enables a higher transmission data rate to be achieved between SU-MIMO transmission and ZF MU-MIMO transmission, and it is possible to increase the data rate irrespective of the spatial correlation between channels is high or low.

Figure 9:
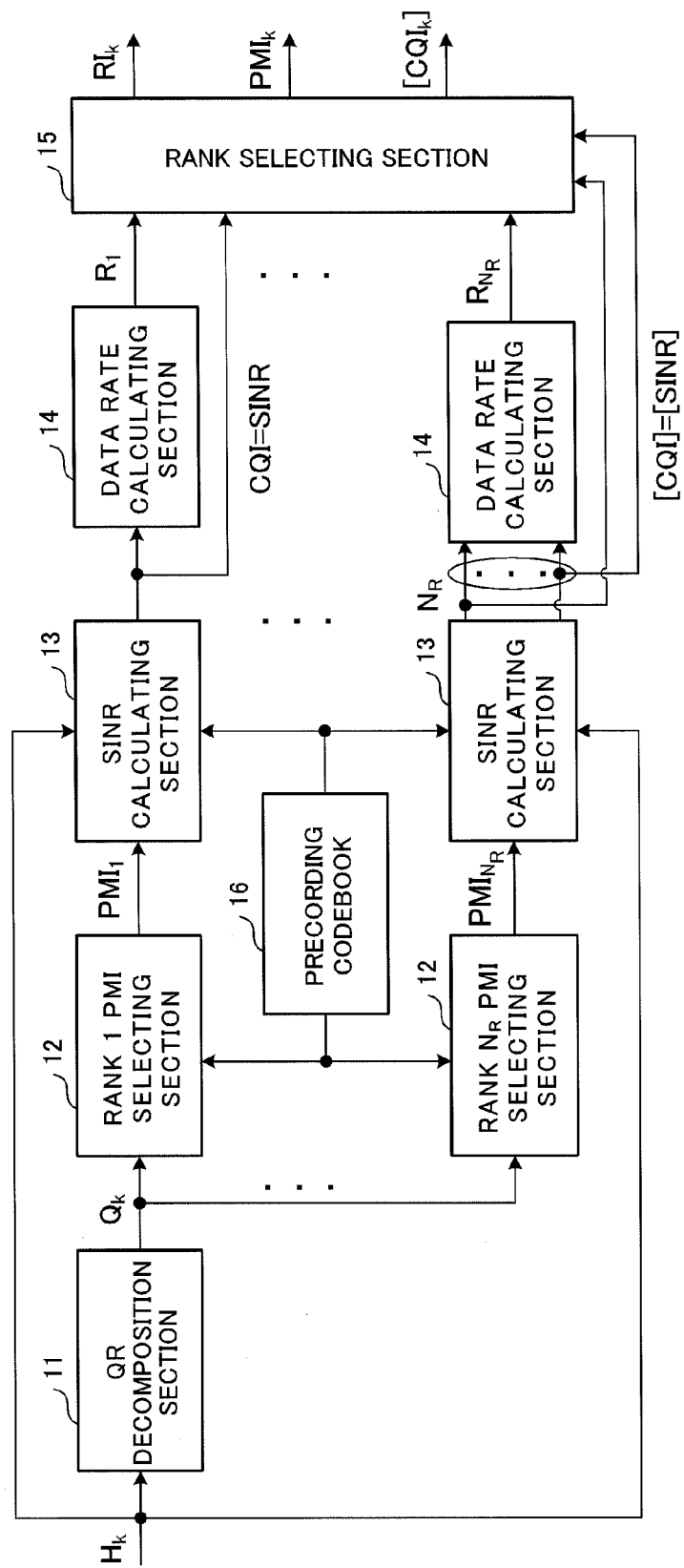
FIG. 9 is a functional block diagram of a mobile station apparatus in the MIMO system according to the invention.
Figure 10:
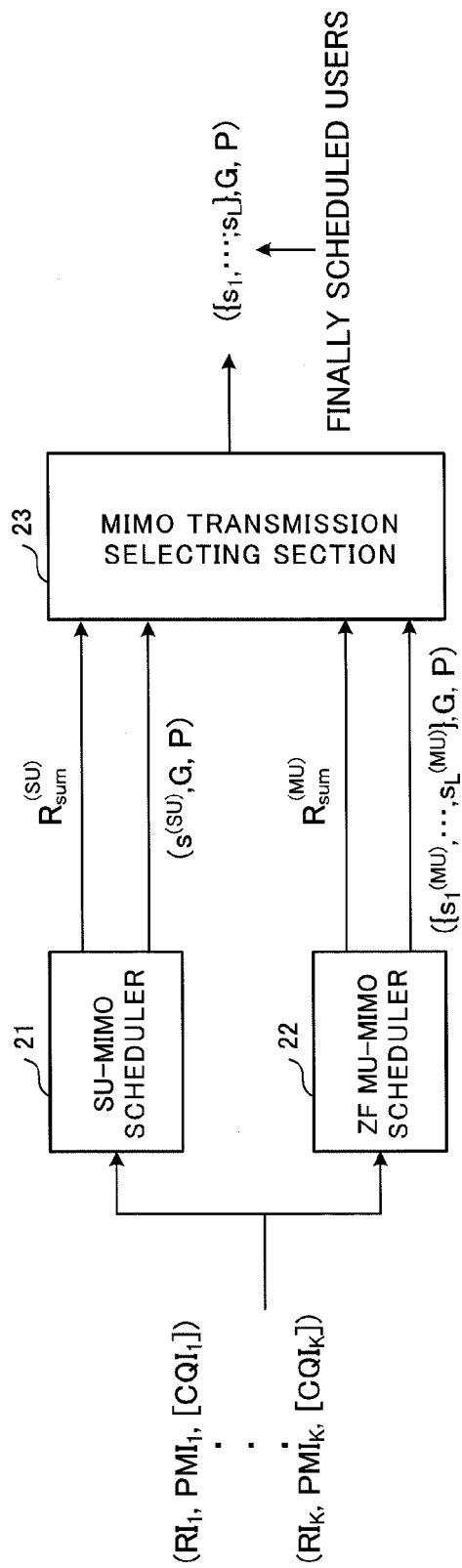
FIG. 10 is a functional block diagram of a base station apparatus in the MIMO system according to the invention.
Figure 11:
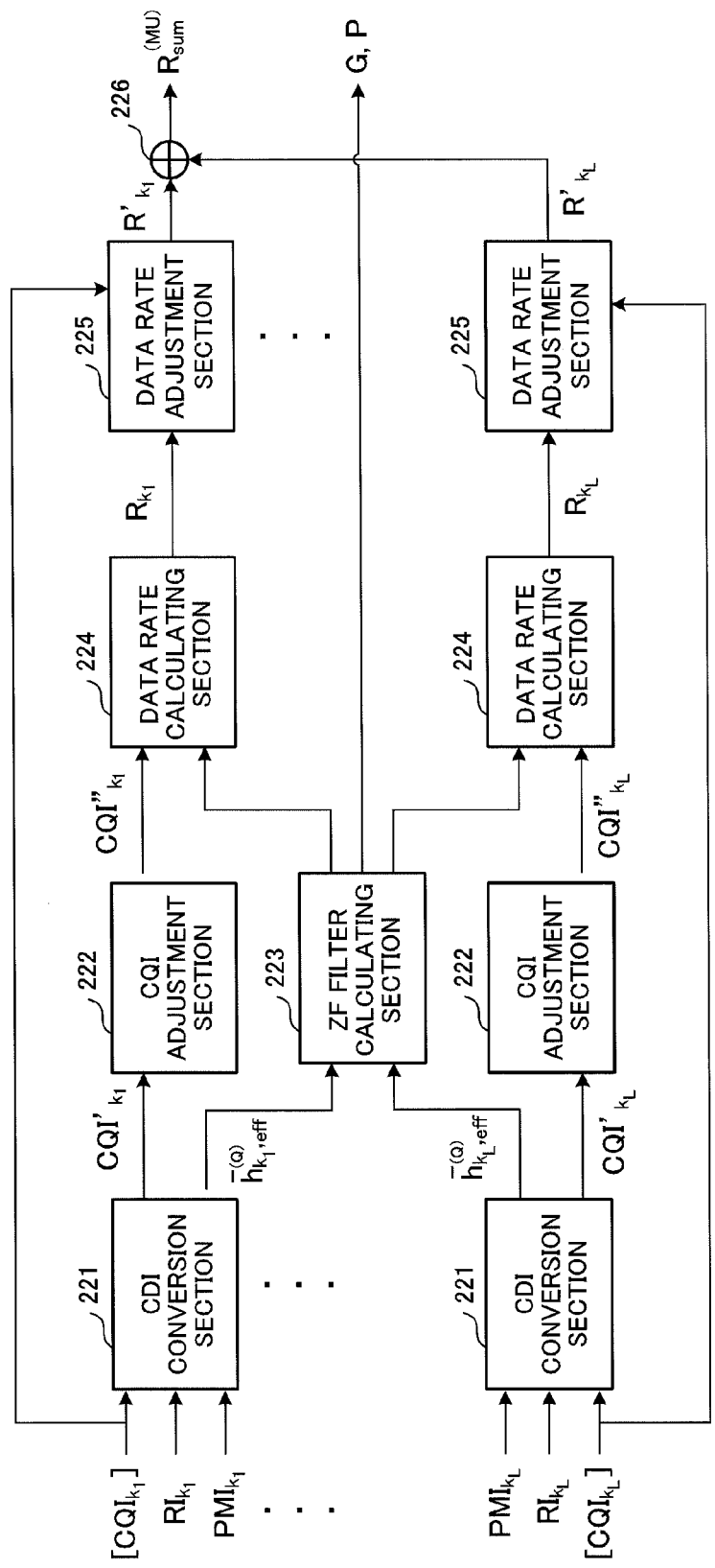
FIG. 11 is a functional block diagram of a ZF MU-MIMO scheduler that the base station apparatus has in the MIMO system according to the invention.

Described next is an Embodiment of the mobile station apparatus UE and base station apparatus eNode B in the complex MIMO system according to the invention. FIG. 9 is a functional block diagram of the mobile station apparatus UE in the complex MIMO system according to the invention. FIG. 10 is a functional block diagram of the base station apparatus eNode B in the complex MIMO system according to the invention. In addition, FIG. 11 is a functional block diagram of a ZF MU-MIMO scheduler that the base station apparatus eNode B has in the complex MIMO system according to the invention. In addition, in FIGS. 9 to 11, for convenience in description, only the function blocks related to the invention are shown.

As shown in FIG. 9, in the mobile station apparatus UE, the Hermitian transpose $H_k$ of the channel matrix $H_k^H$ is input to a QR decomposition section 11 and SINR calculating sections 13. The QR decomposition section 11 performs the QR decomposition processing on the Hermitian transpose $H_k$, and obtains the unitary matrix $Q_k$ reflecting the channel matrix $H_k^H$. In the QR decomposition processing by the QR decomposition section 11, it is designed that the upper triangular matrix $R_k$ is arranged in descending order by the algorithm. The reason why it is thus designed that the diagonal elements of the upper triangular matrix $R_k$ are arranged in descending order is to allow a PMI selecting section 12 associated with a respective rank to select a suitable vector corresponding to the rank number. More specifically, since first L columns are selected for the rank L in (Eq.23) as described above, by arranging the diagonal elements of the upper triangular matrix $R_k$ in descending order, the column vectors of the unitary matrix $Q_k$ have importance from left to right. The unitary matrix $Q_k$ obtained by the QR decomposition processing is input to the PMI selecting section 12 (rank 1 PMI selecting section 12 to rank $N_R$ PMI selecting section 12) associated with the respective rank.

The PMI selecting sections 12 (rank 1 PMI selecting section 12 to rank $N_R$ PMI selecting section 12) corresponding to respective ranks function as part of the selecting section, and select precoding weights (PMIS) approximating the unitary matrix $Q_k$ in which the channel matrix $H_k^H$ is reflected. More specifically, the PMI selecting sections 12 calculate $PMI_1$ to $PMI_{NR}$ by (Eq.23). In this case, each of the PMI selecting sections 12 acquires a precoding weight corresponding to each index of each rank determined in a precoding codebook 16, and selects the PMI corresponding to the precoding weight. The selected $PMI_1$ to $PMI_{NR}$ are input to the SINR calculating sections 13.

The SINR calculating section 13 functions as the calculating section of the CQI, and calculates each $SINR_{L,n,l}$ corresponding to selected $PMI_1$ to $PMI_{NR}$ by (Eq.3). In this case, each of the SINR calculating sections 13 acquires the precoding weight corresponding to each index of each rank determined in the precoding codebook 16, and calculates $SINR_{L,n,l}$ corresponding to the precoding weight. The calculated $SINR_{L,n,l}$ is input to a data rate calculating section 14 and rank selecting section 15. In this case, each of the SINR calculating sections 13 calculates $SINR_{L,n,l}$ corresponding to the rank number to input to the data rate calculating section 14. For example, the SINR calculating section 13 receiving the $PMI_1$ calculates a single SINR, and the SINR calculating section 13 receiving the $PMI_{NR}$ calculates $N_R$ SINRs.

The data rate calculating section 14 calculates the data rate of each rank by (Eq.36) based on the input SINR. Then, calculated data rates $R_1$ to $R_{NR}$ of respective ranks are input to the rank selecting section 15.

$$R_L = \sum_{l=1}^{L} \log(1 + SINR_{L,PMI_{k,L},l}) \quad (\text{Eq. 36})$$

The rank selecting section 15 functions as part of the selecting section, and based on the data rates $R_1$ to $R_{NR}$ of respective ranks input from the data rate calculating sections 14 and $SINR_{L,n,l}$ input from each of the SINR calculating sections as the CQI, selects a rank ($RI_k$) that provides the highest data rate by (Eq.37).

$$RI_k = \underset{1 \le L \le N_R}{\operatorname{argmax}} R_L \quad (\text{Eq. 37})$$

Further, the rank selecting section 15 selects the $PMI_k$ by (Eq.26), while calculating the $CQI_k$ by (Eq.5). By this means, determined are the rank ($RI_k$) that provides the highest data rate, and $PMI_k$ and $CQI_k$ associated with the rank. Then, thus determined $RI_k$, $PMI_k$ and $CQI_k$ are transmitted to the base station apparatus eNode B via feedback means, not shown, as the feedback information.

As shown in FIG. 10, the base station apparatus eNode B is provided with a scheduler (hereinafter, referred to as an "SU-MIMO scheduler") 21 for SU-MIMO transmission that functions as a first scheduler, and a scheduler (hereinafter, referred to as a "ZF MU-MIMO scheduler") 22 for ZF MU-MIMO transmission that functions as a second scheduler. The $RI_1$, $PMI_1$ and $CQI_1$ to $RI_k$, $PMI_k$ and $CQI_k$ determined in respective mobile station apparatuses UE are input to each of the SU-MIMO scheduler 21 and ZF MU-MIMO scheduler 22.

The SU-MIMO scheduler 21 calculates the data rate $R_{sum}^{(SU)}$, which is the highest in the case of performing SU-MIMO transmission, by (Eq.27). Further, the SU-MIMO scheduler 21 selects a schedule user $s^{(SU)}$ in this case by (Eq.28), while calculating the precoding matrix G and transmission power control matrix P by (Eq.6) and (Eq.7). The data rate $R_{sum}^{(SU)}$, schedule user $s^{(SU)}$, precoding matrix G and transmission power control matrix P are output to a MIMO transmission selecting section 23.

The ZF MU-MIMO scheduler 22 calculates the data rate $R_{sum}^{(MU)}$, which is the highest in the case of performing ZF MU-MIMO transmission, by the sum of the data rates $R_k$ of respective streams calculated by (Eq.33). Further, the ZF MU-MIMO scheduler 22 selects a schedule user $s_L^{(MU)}$ in this case. In addition, to select a schedule user $s_L^{(MU)}$ in ZF MU-MIMO transmission, it is possible to select an arbitrary search method, and for example, used are an exhaustive search, greedy algorithm specified in R1-062483 of 3GPP, etc. Furthermore, the ZF MU-MIMO scheduler 22 calculates the precoding matrix G by (Eq.20) and (Eq.21), while calculating the transmission power control matrix P by (Eq.38) based on the transmission power control matrix $p_k$ calculated by (Eq.22).

$$P = \operatorname{diag}(p_1, \ldots, p_L) \quad (\text{Eq.38})$$

The data rate $R_{sum}^{(MU)}$, schedule user $s_L^{(MU)}$, precoding matrix G and transmission power control matrix P are output to the MIMO transmission selecting section 23.

The MIMO transmission selecting section 23 functions as the transmission scheme selecting section, compares the data rate $R_{sum}^{(SU)}$ input from the SU-MIMO scheduler 21 with the data rate $R_{sum}^{(MU)}$ input from the ZF MU-MIMO scheduler 22, and selects a MIMO transmission scheme of the higher data rate. Then, by the selected MIMO transmission scheme, the base station apparatus transmits data to scheduler users $\{s_1, \ldots, s_L\}$ that are finally selected, using precoding matrixes G and transmission power control matrixes P associated with the scheduler users $\{s_1, \ldots, s_L\}$.

In the ZF MU-MIMO scheduler 22 that the base station apparatus eNode B has, as shown in FIG. 11, the $RI_{k1}$, $PMI_{k1}$ and $CQI_{k1}$ to $RI_{kL}$, $PMI_{kL}$ and $CQI_{kL}$ determined in the mobile station apparatus UE are input to CDI conversion sections 221 associated with respective ranks. Further, the $CQI_{k1}$ to $CQI_{kL}$ determined in the mobile station apparatus UE are also input to data rate adjustment sections 225 associated with respective ranks.

The CDI conversion sections 221 function as the conversion section, and perform computation processing of (Eq.29) and (Eq.30) to convert $PMI_{k1}, \ldots, PMI_{kL}$ received from the mobile station apparatus UE into respective CDIs. Herein, elements of the precoding matrix $G_k$ in the lth column defined as the effective channel $\bar{h}_{k,eff}^{(Q)}$ by (Eq.29) are obtained as information corresponding to the CDI. Further, each of the CDI conversion sections 221 calculates a CQI' by (Eq.31) to correct an error of the CQI occurring in transmission in rank 1 per mobile station apparatus UE in ZF MU-MIMO, from the CQI that is fed back with the rank $RI_k$ of SU-MIMO assumed. Thus calculated $CQI'_{k1}$ to $CQI'_{kL}$ are output to a CQI adjustment section 222, and effective channels $\bar{h}_{k1,eff}^{(Q)}$ to $\bar{h}_{kL,eff}^{(Q)}$ are output to a ZF filter calculating section 223.

The CQI adjustment sections 222 function as the adjustment section of CQI, and adjust $CQI'_{k1}$ to $CQI'_{kL}$ input from respective CDI conversion sections 221 by (Eq.32) corresponding to the relationship between the rank number L (the number of streams) and the number $N_R$ of reception antennas. By this means, when the rank number L is lower than or equal to the number $N_R$ of reception antennas, $CQI'_{k1}$ to $CQI'_{kL}$ are not adjusted. Meanwhile, when the rank number L is higher than the number $N_R$ of reception antennas, $CQI'_{k1}$ to $CQI'_{kL}$ are adjusted. $CQI''_{k1}$ to $CQI''_{kL}$ that are the same as $CQI'_{k1}$ to $CQI'_{kL}$ are obtained in the former case, and $CQI''_{k1}$ to $CQI''_{kL}$ obtained by adjusting $CQI'_{k1}$ to $CQI'_{kL}$ are obtained in the latter case.

The ZF filter calculating section 223 functions as the selecting section of precoding matrix, and calculates an actual channel $H_{eff}^{(Q)}$ by (Eq.20) based on $\bar{h}_{k1,eff}^{(Q)}$ to $\bar{h}_{kL,eff}^{(Q)}$ input from respective CDI conversion sections 221. Then, based on the actual channel $H_{eff}^{(Q)}$, the section calculates the precoding matrix G by (Eq.21). Further, based on the precoding weight $g_k$ obtained from the effective channel $\bar{h}_{k,eff}^{(Q)}$, the section calculates diagonal elements $p_1$ to $p_k$ of the transmission power control matrix by (Eq.22), and based on the diagonal elements $p_1$ to $p_k$ of the transmission power control matrix, calculates the transmission power control matrix P by (Eq.38). Thus calculated precoding matrix G and transmission power control matrix P are output to the MIMO transmission selecting section 23.

Each of data rate calculating sections 224 function as the calculation section of data rate, and calculate data rates $R_{k1}$ to $R_{kL}$ of respective transmission streams by (Eq.33), based on the $CQI''_{k1}$ to $CQI''_{kL}$ input from the CQI adjustment sections 222, and the precoding weight $g_k$ provided from the ZF filter calculating section 223. Thus calculated data rates $R_{k1}$ to $R_{kL}$ are output to data rate adjustment sections 225.

The data rate adjustment sections 225 function as the adjustment section of data rate, and adjust data rates $R_{k1}$ to $R_{kL}$ input from respective data rate calculating sections 224 by (Eq.34) corresponding to the relationship between the rank number L (the number of streams) and the number $N_R$ of reception antennas. By this means, when the rank number L is lower than or equal to the number $N_R$ of reception antennas, data rates $R_{k1}$ to $R_{kL}$ are not adjusted. Meanwhile, when the rank number L is higher than the number $N_R$ of reception antennas, data rates $R_{k1}$ to $R_{kL}$ are adjusted. Data rates $R'_{k1}$ to $R'_{kL}$ that are the same as $R_{k1}$ to $R_{kL}$ are obtained in the former case, and data rates $R'_{k1}$ to $R'_{kL}$ obtained by adjusting $R_{k1}$ to $R_{kL}$ are obtained in the latter case.

In addition, each of the data rate adjustment sections 225 calculates a rate adjustment value $C_k$ by (Eq.35), based on respective one of input $CQI_{k1}$ to $CQI_{kL}$. When the rank number L is higher than the number $N_R$ of reception antennas, data rates $R'_{k1}$ to $R'_{kL}$ are calculated based on thus calculated rate adjustment values $C_k$. The calculated data rates $R'_{k1}$ to $R'_{kL}$ are input to an adder 226, and the data rate $R_{sum}^{(MU)}$ is calculated as the sum of the rates. Thus calculated data rate $R_{sum}^{(MU)}$ is output to the MIMO transmission selecting section 23. The MIMO transmission selecting section 23 selects a MIMO transmission scheme based on the data rate $R_{SUM}^{(MU)}$ and data rate $R_{SUM}^{(SU)}$ as described previously.

The data rate obtained in the complex MIMO system according to the invention will be described below in comparison with data rates in the LTE-scheme SU-MIMO, MU-MIMO and LTE-A-scheme ZF MU-MIMO. Each of FIGS. 12 and 13 contains graphs to explain the data rate obtained in the complex MIMO system (Hybrid MIMO system) according to the invention. In addition, in FIG. 13, for convenience in description, the data rate in MU-MIMO is omitted.

Figure 12:
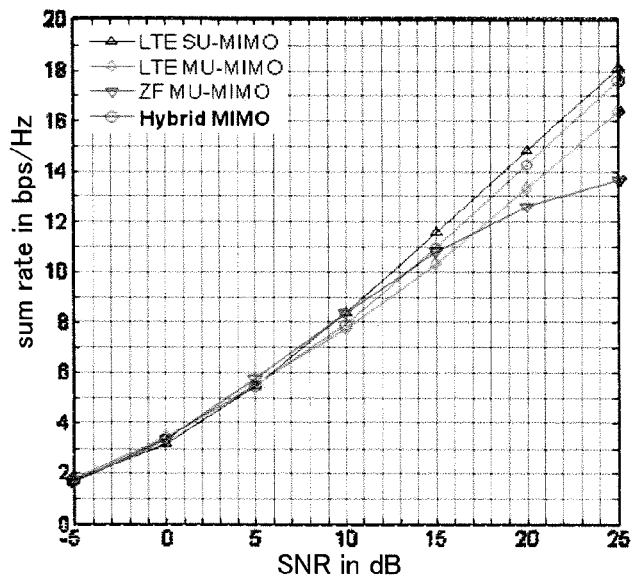
FIG. 12 contains graphs to explain data rates obtained in the MIMO system according to the invention.
Figure 12:
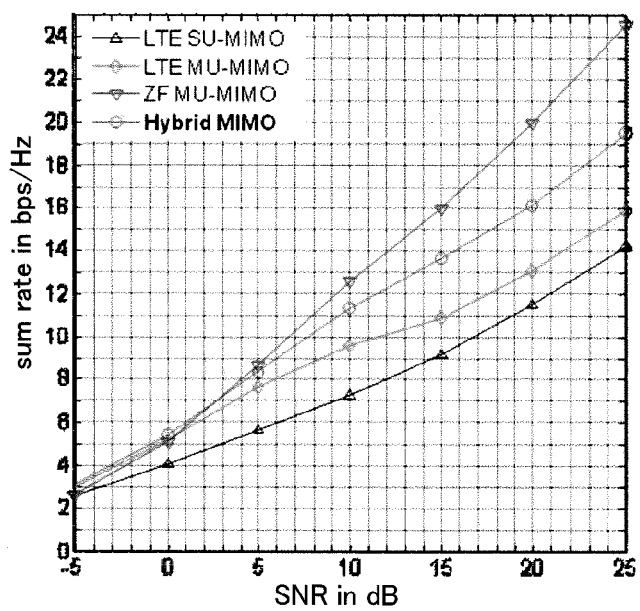
Figure 13:
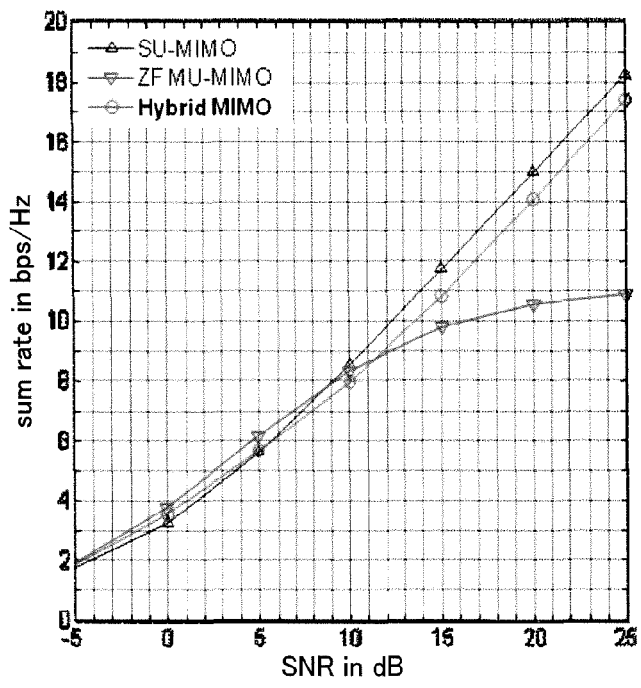
FIG. 13 contains graphs to explain data rates obtained in the MIMO system according to the invention.
Figure 13:
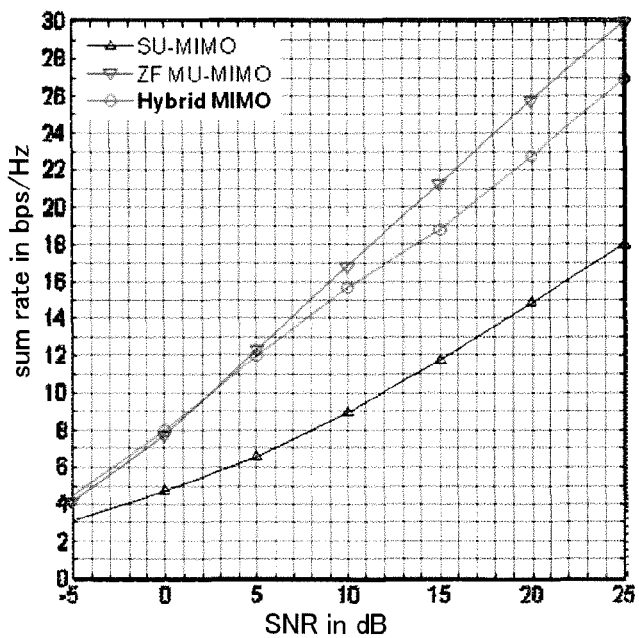

FIG. 12 shows the case where the number of antennas (transmission antennas) in the base station apparatus eNode B is "4" and the number of antennas (reception antennas) in the mobile station apparatus UE is "2". Meanwhile, FIG. 13 shows the case where the number of antennas (transmission antennas) in the base station apparatus eNode B is "8" and the number of antennas (reception antennas) in the mobile station apparatus UE is "2". Each of FIGS. 12(a) and 13(a) shows data rates with the spatial correlation assumed not to exist, and each of FIGS. 12(b) and 13(b) shows data rates in the case where the spatial correlation is high.

As shown in FIG. 12(a), in the environment with the spatial correlation assumed not to exist, in the substantially whole range of SNR, the data rate of SU-MIMO changes with the highest rate. The data rate of MU-MIMO changes with the lower rate than SU-MIMO. In ZF MU-MIMO, the data rate equal to SU-MIMO is acquired in the range of lower SNRs, but the data rate deteriorates as the SNR increases. In contrast thereto, in the data rate in the complex MIMO system according to the invention, the rate does not reach SU-MIMO, but is slightly lower than SU-MIMO, and changes with the higher rate than MU-MIMO.

Meanwhile, as shown in FIG. 12(b), in the environment in which the spatial correlation is high, in the substantially whole range of SNR, the data rate of ZF MU-MIMO changes with the highest rate. The data rate of MU-MIMO changes with the rate significantly lower than ZF MU-MIMO. The data rate of SU-MIMO changes with the further lower rate than MU-MIMO. In contrast thereto, in the data rate in the complex MIMO system according to the invention, the rate does not reach ZF MU-MIMO, but changes with the improved higher rate than MU-MIMO.

As shown in FIGS. 13(a) and 13(b), in changes in the data rates in the case where the number of antennas in the base station apparatus eNode B is "8" and the number of antennas in the mobile station apparatus UE is "2", the substantially same effects as the changes as shown in FIGS. 12(a) and 12(b) are obtained. As can be seen from the changes in the data rates, in the complex MIMO system according to the invention, it is possible to obtain changes of relatively high data rates both in the environment with the spatial correlation assumed not to exist and in the environment in which the spatial correlation is high. As a result, it is possible to increase the data rate irrespective of whether the spatial correlation between MIMO channels is high or low.

As described above, in the complex MIMO system according the invention, the mobile station apparatus UE transmits a PMI and RI reflecting channel characteristics (channel state) as feedback, and the base station apparatus eNode B selects a transmission scheme corresponding to a higher data rate between the data rates of SU-MIMO transmission and ZF MU-MIMO transmission calculated based on the PMI. It is thereby possible to perform data transmission while switching the transmission scheme as appropriate corresponding to the channel state, and it is thus possible to increase the data rate irrespective of whether the spatial correlation between channels is high or low.

Particularly, in the complex MIMO system according to the invention, since the PMI is transmitted from the mobile station apparatus UE as the feedback information, it is possible to increase the data rate irrespective of whether the spatial correlation between channels is high or low, while ensuring compatibility with the LTE-scheme MIMO system.

As described above, the invention present is specifically described using the above-mentioned Embodiment, but it is obvious to a person skilled in the art that the invention is not limited to the Embodiment described in the Description. The invention is capable of being carried into practice as modified and changed aspects without departing from the subject matter and scope of the invention defined by the descriptions of the scope of the claims. Accordingly, the descriptions of the Description are intended for illustrative explanation, and do not have any restrictive meaning to the invention.

For example, the above-mentioned Embodiment describes the case where a stream of the highest CQI is selected from among streams by (Eq.29) and (Eq.30), and one precoding vector (elements of the precoding matrix $G_k$ in the lth row) associated with the stream is defined as an effective channel in the CDI conversion processing. However, the content of the effective channel defined in the CDI conversion processing is not limited thereto, and is capable of being modified as appropriate. For example, instead of selecting the stream of the highest CQI from streams, it is also possible to define a vector obtained by performing linear combining on a plurality of precoding vectors associated with a plurality of streams as the effective channel.

The present application is based on Japanese Patent Application No. 2009-272443 filed on Nov. 30, 2009, entire content of which is expressly incorporated by reference herein.

The invention claimed is:

1. A mobile station apparatus in a Multi Input Multi Output (MIMO) system in which a base station apparatus switches between Single User MIMO (SU-MIMO) transmission and Zero Forcing MIMO (ZF MU-MIMO) transmission based on feedback information from the mobile station apparatus to perform data transmission, comprising:
    a selecting section configured to select Rank Indicator (RI) and to select a Precoding Matrix Indicator (PMI) identifying a precoding matrix minimizing a chordal distance between the precoding matrix and an orthonormalized unitary matrix obtained from an Hermitian transpose of a channel matrix indicative of channel characteristics;
    a calculating section configured to calculate a Channel Quality Indicator (CQI) from the PMI; and
    a feedback section configured to transmit the PMI, the RI and the CQI to the base station apparatus as the feedback information.

2. The mobile station apparatus according to claim 1, wherein the orthonormalized unitary matrix is obtained by QR decomposition from the Hermitian transpose of the channel matrix.

3. The mobile station apparatus according to claim 1, wherein the orthonormalized unitary matrix is obtained by Singular Value Decomposition from the Hermitian transpose of the channel matrix.

4. A base station apparatus in a Multi Input Multi Output (MIMO) system in which the base station apparatus switches between Single User MIMO (SU-MIMO) transmission and Zero Forcing MIMO (ZF MU-MIMO) transmission based on feedback information from the mobile station apparatus to perform data transmission, comprising:
    a first scheduler configured to calculate a first data rate of a case of performing SU-MIMO transmission, based on a Precoding Matrix Indicator (PMI) corresponding to an Hermitian transpose of a channel matrix indicative of channel characteristics, transmitted from a mobile station apparatus as feedback;
    a second scheduler configured to calculate a second data rate of a case of performing ZF MU-MIMO transmission based on the PMI; and
    a transmission scheme selecting section configured to select a transmission scheme corresponding to a higher data rate between the first and second data rates.

5. The base station apparatus according to claim 4, wherein the second scheduler has a conversion section configured to convert the PMI into a Channel Direction Indicator (CDI), a selecting section configured to select a precoding matrix based on the CDI, a Channel Quality Indicator (CQI) adjustment section configured to adjust a CQI transmitted from the mobile station apparatus as feedback, a calculating section configured to calculate a data rate based on the precoding matrix selected in the selecting section and the CQI adjusted in the CQI adjustment section, and a data rate adjustment section configured to adjust the data rate calculated in the calculating section.

6. The base station apparatus according to claim 5, wherein the CQI adjustment section adjusts the CQI based on the number of transmission streams and the number of antennas in the mobile station apparatus.

7. The base station apparatus according to claim 6, wherein the CQI adjustment section maintains the CQI without adjusting the CQI when the number of transmission streams is the number of antennas in the mobile station apparatus or less, while adjusting the CQI when the number of transmission streams exceeds the number of antennas in the mobile station apparatus.

8. The base station apparatus according to claim 5, wherein the data rate adjustment section adjusts the data rate based on the number of transmission streams and the number of antennas in the mobile station apparatus.

9. The base station apparatus according to claim 8, wherein the data rate adjustment section maintains the data rate without adjusting the data rate when the number of transmission streams is the number of antennas in the mobile station apparatus or less, while adjusting the data rate when the number of transmission streams exceeds the number of antennas in the mobile station apparatus.

10. The base station apparatus according to claim 9, wherein the data rate adjustment section adjusts the data rate according to a table based on simulation actual results using, as parameters, a spatial correlation between antennas of the base station apparatus, the CQI transmitted from the mobile station apparatus as feedback, and the number of streams exceeding the number of antennas in the mobile station apparatus.

11. A Multi Input Multi Output (MIMO) system in which a base station apparatus switches between Single User MIMO (SU-MIMO) transmission and Zero Forcing MIMO (ZF MU-MIMO) transmission based on feedback information from a mobile station apparatus to perform data transmission, comprising:
    the mobile station apparatus which selects a Precoding Matrix Indicator (PMI) and a Rank Indicator (RI) corresponding to an Hermitian transpose of a channel matrix indicative of channel characteristics, calculates a Channel Quality Indicator (CQI) from the PMI, and transmits the PMI, the RI and the CQI to the base station apparatus as feedback information; and
    the base station apparatus which calculates a first data rate of a case of performing SU-MIMO transmission and a second data rate of a case of performing ZF MU-MIMO transmission based on the PMI transmitted from the mobile station apparatus as feedback, and selects a transmission scheme corresponding to a higher data rate between the first and second data rates.

12. A data transmission method in which a base station apparatus switches between Single User MIMO (SU-MIMO) transmission and Zero Forcing MIMO (ZF MU-MIMO) transmission based on feedback information from a mobile station apparatus to perform data transmission, comprising:
    in the mobile station apparatus, selecting a Precoding Matrix Indicator (PMI) and a Rank Indicator (RI) corresponding to an Hermitian transpose of a channel matrix indicative of channel characteristics;
    calculating a Channel Quality Indicator (CQI) from the PMI;
    transmitting the PMI, the RI and the CQI to the base station apparatus as feedback information;
    in the base station apparatus, calculating a first data rate of a case of performing SU-MIMO transmission based on the PMI transmitted from the mobile station apparatus as feedback;
    calculating a second data rate of a case of performing ZF MU-MIMO transmission based on the PMI; and
    selecting a transmission scheme corresponding to a higher data rate between the first and second data rates.

\* \* \* \* \*